United States Patent [19]

Imanaka et al.

[11] Patent Number: 4,734,904
[45] Date of Patent: Mar. 29, 1988

[54] REPRODUCING-ONLY AND RECORDABLE-REPRODUCEABLE OPTICAL DISCS AND COMMON OPTICAL DISC PLAYER THEREFOR

[75] Inventors: Ryoichi Imanaka, Hirakata; Yoshihiro Okino, Uji; Tetsuo Saimi, Hirakata, all of Japan

[73] Assignee: Matsushita Electric Industrial Co., Ltd., Osaka, Japan

[21] Appl. No.: 27,410

[22] Filed: Mar. 18, 1987

Related U.S. Application Data

[63] Continuation-in-part of Ser. No. 733,805, May 14, 1985, abandoned.

[30] Foreign Application Priority Data

May 16, 1984 [JP] Japan .................................. 59-97973

[51] Int. Cl.$^4$ .............................................. G11B 7/00
[52] U.S. Cl. ..................................... 369/109; 369/275
[58] Field of Search ................. 369/109, 110, 275, 44, 369/45, 46; 346/762, 135.1

[56] References Cited

U.S. PATENT DOCUMENTS 3,914,595 10/1975 Tinet .
4,325,135 4/1982 Dil et al. ............................. 369/109
4,326,282 4/1982 Verboom et al. .................... 369/275
4,385,372 5/1983 Drexler ............................... 369/275
4,466,091 8/1984 Takagi et al. ....................... 369/109
4,547,875 10/1985 Ohta et al. .......................... 369/275
4,553,228 11/1985 Gerard et al. ....................... 369/275

Primary Examiner—Donald McElheny, Jr.
Attorney, Agent, or Firm—Wenderoth, Lind & Ponack

[57] ABSTRACT

The combination of recordable-reproduceable optical discs and reproducing-only optical discs and an optical disc player which is capable of reproducing recorded signals both from the recordable-reproduceable optical disc possessing pregrooves and the reproducing-only optical disc possessing recording pits by means of a common optical system. The common optical system has a common laser for irradiating both types of discs with a laser beam used for reading the discs. The wavelength of the laser is $\lambda$ and the depth or height of the pregrooves of the recordable-reproduceable optical disc is made equal to or less than $\lambda/8n$, and the depth or height of the recording pits of the reproducing-only optical disc is made equal to or greater than $\lambda/8n$ but less than $\lambda/4n$, wherein n is the refractive index of the substrate of the disc or the protective layer provided on the surface thereof.

2 Claims, 6 Drawing Figures

REPRODUCING-ONLY AND RECORDABLE-REPRODUCEABLE OPTICAL DISCS AND COMMON OPTICAL DISC PLAYER THEREFOR

CROSS-REFERENCE TO RELATED APPLICATIONS

This application is a continuation-in-part of now abandoned U.S. application Ser. No. 733,805, filed May 14, 1985.

BACKGROUND OF THE INVENTION

1. Field of the Invention

The present invention relates to the combination of recordable-reproduceable optical discs and reproducing-only optical discs and an optical disc player which is capable of reproducing recorded signals both from the recordable-reproduceable optical disc possessing pregrooves and the reproducing-only optical disc possessing recording pits by means of a common optical system having a common laser.

2. Description of the Prior Art

A recordable optical disc can record and reproduce signals by using a semiconductor laser in a recording layer containing, for example, tellurium oxide, and the signals are recorded in a contrast pattern as a change in the reflectivity. Pregrooves showing the recording tracks are preliminarily provided in the optical disc for raising the recording density and facilitating the recording and playing operation. By detecting these pregrooves, signals are recorded and reproduced on the pregrooves.

On the other hand, the reproducing-only disc is manufactured as follows: the master board of a reproducing-only disc is a glass board, on which photoresist is applied, and the light source or argon laser beam is modulated by a photo modulator, and signals are recorded. From the recorded master board, a stamper is prepared through the developing process and plating process, and a replica disc is made from this stamper by using a press. A reflection plane is evaporated to this replica disc, and a reproducing-only disc is thus complete. In the thus manufactured reproducing-only disc, signals are recorded in tiny undulated patterns (called signal pits).

Thus, the reproducing-only disc and recordable optical disc are basically different in their characteristics. Conventionally, these recordable discs and reproducing-only disc were of different systems, and were not related to each other, so that they could not be reproduced commonly by the same optical system.

SUMMARY OF THE INVENTION

It is hence a primary object of this invention to present the combination of recordable-reproduceable optical discs and reproducing-only optical discs and an optical disc player capable of reproducing recorded signals both from the recordable-reproduceable and the reproducing-only discs by a common optical system by forming the pregrooves of the recordable disc and the bit shape of reproducing-only disc in a specific mutual relationship with respect to each other and to the frequency of the common laser of the common optical system.

The abovenoted object of the invention may be effected by providing the combination of recordable-reproduceable optical discs and reproducing-only optical discs and an optical disc player having a common optical system for reproducing recorded signals both from a recordable-reproduceable optical disc having pregrooves and a reproducing-only optical disc having recording pits, wherein said common optical system has a common laser for irradiating both recordable-reproduceable discs and reproducing-only discs with a laser beam used for reading said discs, said laser having a wavelength $\lambda$, and wherein a depth or height of said pregrooves of said recordable-reproduceable optical disc is made equal to or less than $\lambda/8n$ and a depth or height of said recording pits of said reproducing-only optical disc is made equal to or greater than $\lambda/8n$ but less than $\lambda/4n$, and wherein n is a refractive index of a substrate of said discs or a refractive index of a protective layer provided on a surface of said discs.

DESCRIPTION OF THE PREFERRED EMBODIMENT

Figure 1:
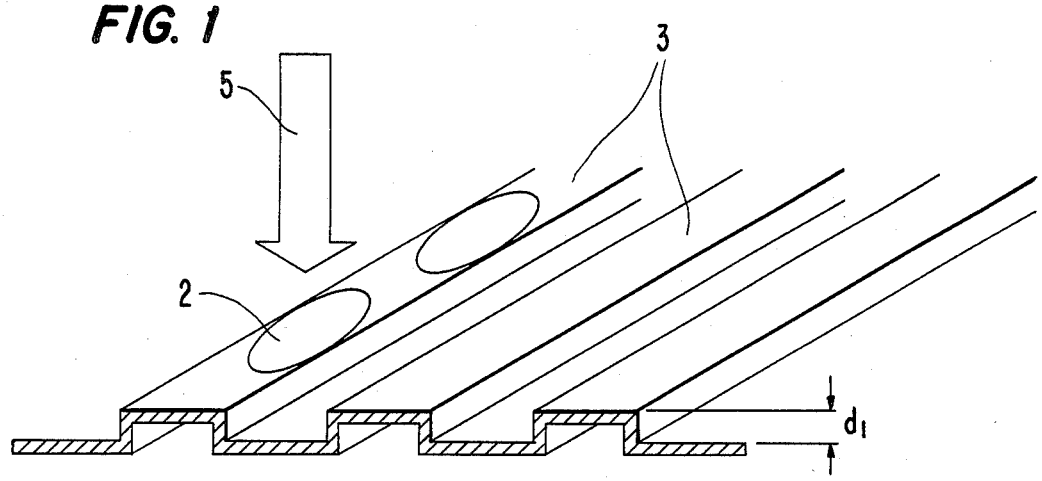
FIG. 1 is a partially cutaway perspective view showing the composition of a recordable disc.

FIG. 1 shows the recording process of a recordable disc schematically, wherein numeral 1 is a recording layer. When the layer 1 is irradiated with a specified laser beam 5 used for recording, the reflectivity in the illuminated area 2 is changed and the recording pattern is formed. Numeral 3 denotes pregrooves which are provided on the recording layer 1 of the disc substrate along the recording tracks. The laser beam 5 is emitted while tracking the pregrooves 3, whose height is indicated by $d_1$. In the case of a recordable disc, the reflectivity of the recording layer 1 before the signal is recorded is 10 to 15%, while it increases to 25 to 30% where a signal has been recorded.

Figure 2:
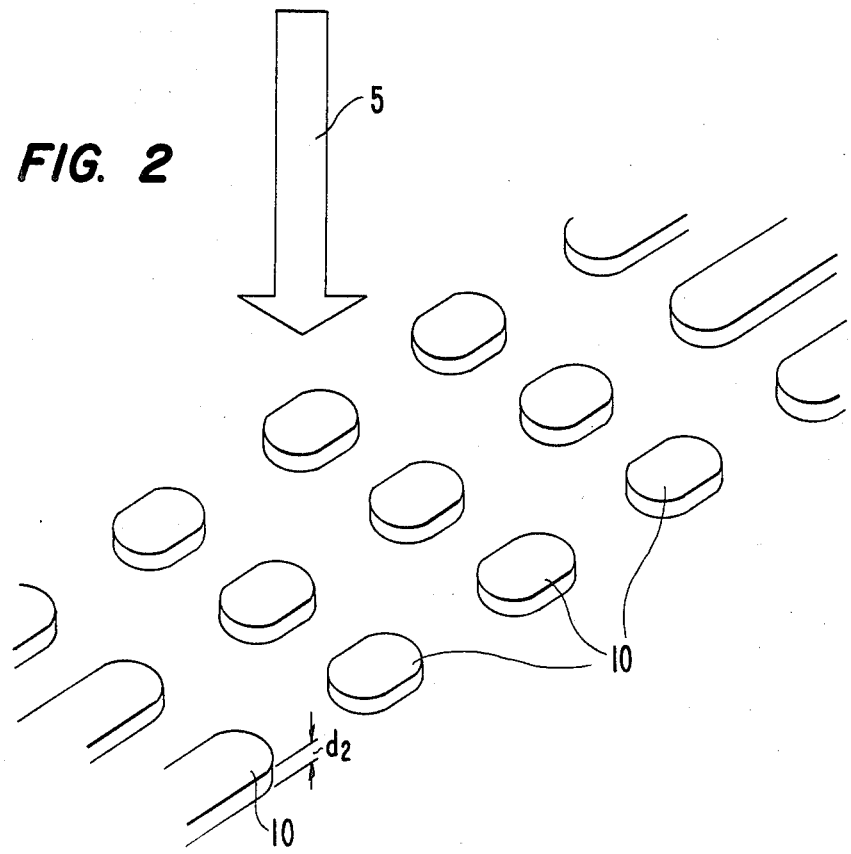
FIG. 2 is a partially cutaway perspective view showing the composition of a reproducing-only disc.

A reproducing-only disc is shown in FIG. 2. In this case, recording pits 10 are transferred on the disc substrate by means of a stamper, and a reflective film is provided. Therefore, its reflectivity is over 80%. Since the reflectivity differs between the two types of discs, when attempting to reproduce the two discs by a common optical system, it is necessary to use the laser beam in its original one-beam form without dividing it in order that the disc of the lower reflectivity (i.e. - recordable-reproduceable type) may also be reproduced. In turn, to obtain a tracking signal using only one laser beam, it is necessary to detect the tracking signal by far-field method.

Figure 3:
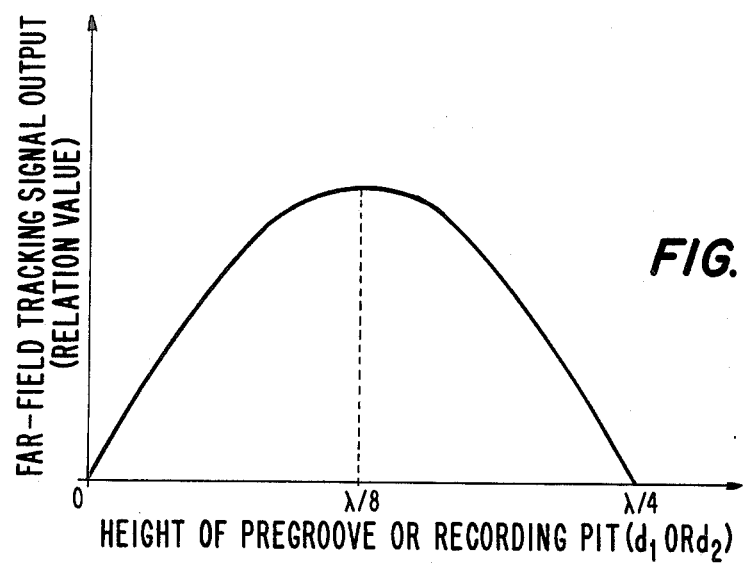
FIG. 3 is a graph representing the relationship between the height of the pregrooves or recording pits and the output of a far-field system tracking system.

Incidentally, when the tracking signal is detected by the far-field method, it becomes its maximum value when the height $d_2$ of the pregrooves or signal pits is $\lambda/8$ ($\lambda$ is the wavelength of laser beam), and 0 when it is $\lambda/4$. In FIG. 3, the relationship between the height of the recording pits and the output of the far-field tracking detection signal is shown.

In the present invention, the far-field tracking detection signal is set so as to be obtained satisfactorily when reproducing recorded signals both from the recordable disc and the reproducing-only disc.

Figure 4:
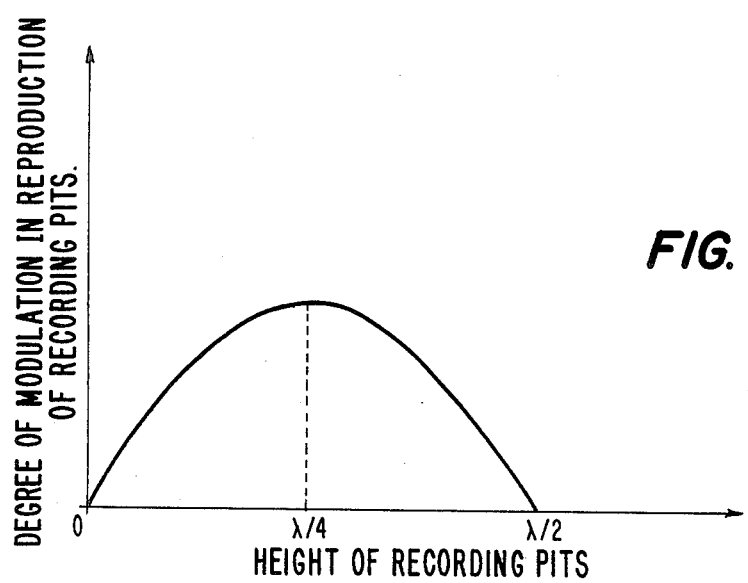
FIG. 4 is a graph showing the relationship between the height of recording pits and the degree of modulation at the time of reproduction of the recording pits.

The relationship between the degree of modulation when reproducing recorded signals from the recording pits shown in FIG. 2 and the height d of the recording pits is shown in FIG. 4. Thus, when the height $d_2$ of the recording pits shown in FIG. 2 is $\lambda/4$, the degree of modulation of the reproduced signal is at its maximum. Therefore, in the case of a reproducing-only optical disc having recording pits $d_2$ as shown in FIG. 2, it is normal to set the height of the pits to be equal to $\lambda/4$. Accordingly, the far-field tracking signal is theoretically 0 at $\lambda/4$ as shown in FIG. 3, and the tracking servo action by the far-field tracking signal is impossible. In accordance with the present invention, therefore, in order to use the far-field tracking servo with one laser beam, the height $d_2$ of the recording pits shown in FIG. 2 is set to be less than $\lambda/4$ but not less than $\lambda/8$.

Figure 5:
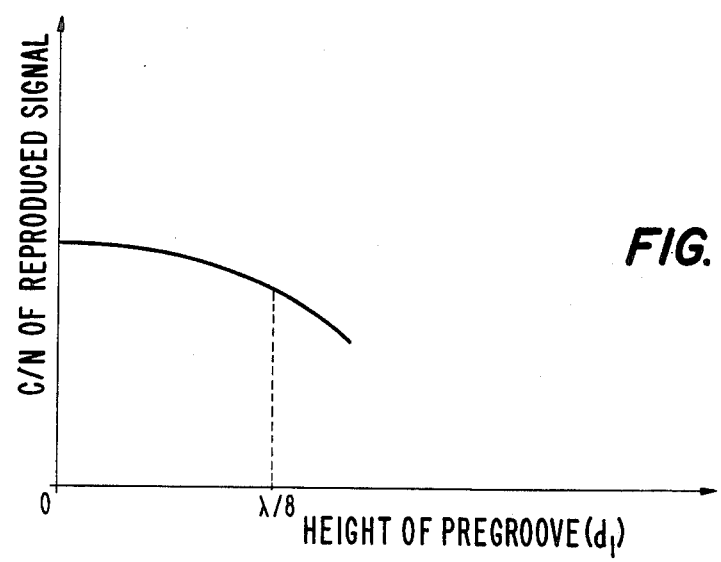
FIG. 5 is a diagram denoting the relationship between the height of the pregrooves and the C/N during recording or reproduction of signals from a recordable disc.

On the other hand, when signals are recorded and reproduced in the pregrooves of the recordable disc shown in FIG. 1, it is known that the C/N (carrier to noise ratio) of the reproduced signals increases when the height $d_1$ of the pregrooves decreases as shown in FIG. 5. It is therefore preferable to set the height $d_1$ of the pregrooves to be smaller than $\lambda/8$.

That is, in order to reproduce recorded signals both from the recordable disc and the reproducing-only disc using the same optical system, the height of the pregrooves of the recordable disc must be set equal to or smaller than $\lambda/8$, and the height of the recording pits of the reproducing-only disc must be set equal to or greater than $\lambda/8$ but less than $\lambda/4$.

In the case of actual optical discs, however, since the laser beam penetrates through the disc substrate to illuminate the pregrooves or recording pits and the recorded signals are read out, or the surface of the pregrooves or recording pits is covered with a protective layer and the laser beam is irradiated through this protective layer, the height of the pregrooves of the recordable disc are set to $\lambda/8n$ or less considering the refractive index n of the disc substrate or protective layer, and the height of the recording pits of the reproducing-only disc is set to $\lambda/8n$ or more but less than $\lambda/4n$.

Figure 6:
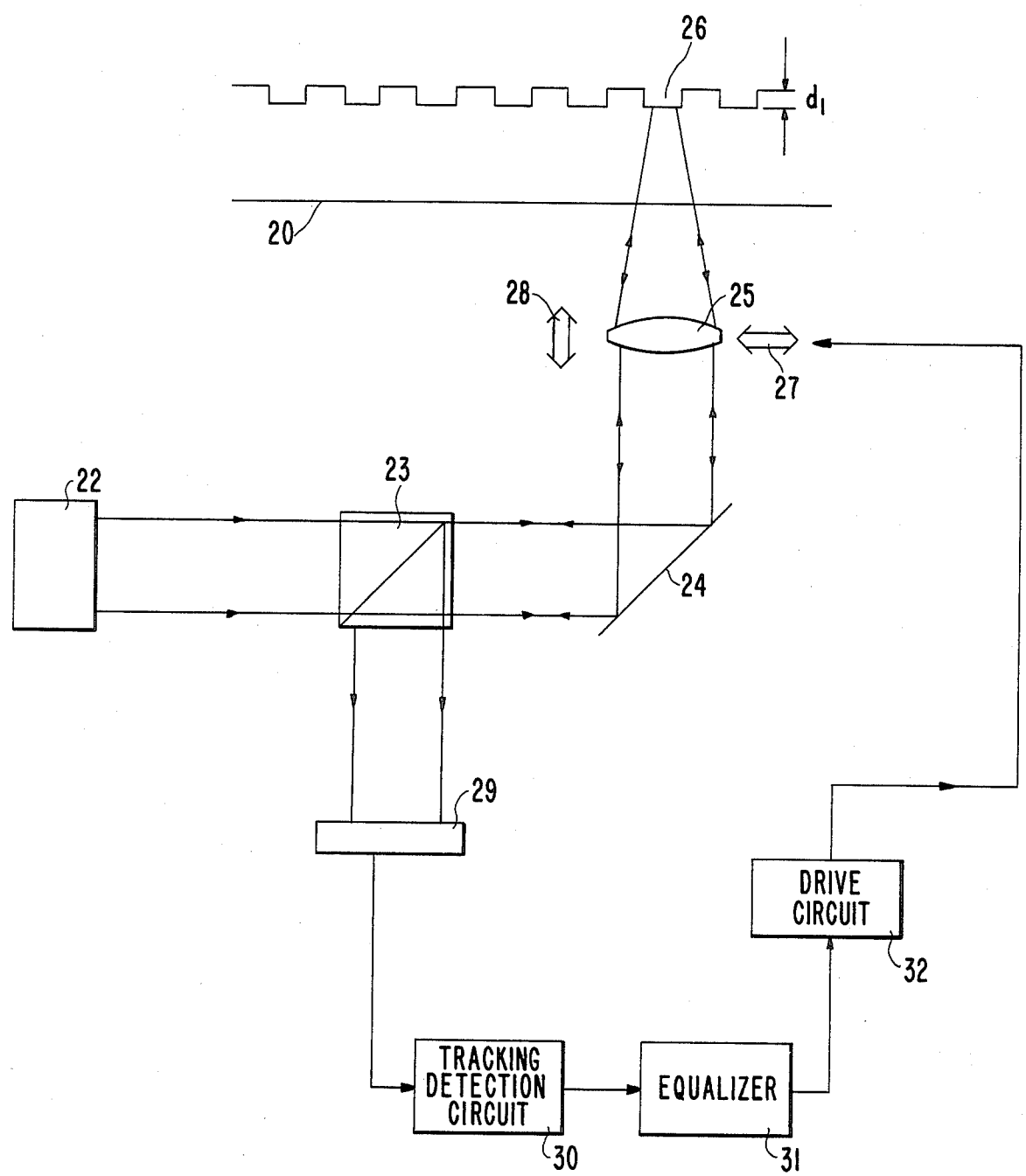
FIG. 6 is a block diagram illustrating one of the embodiments of the player using both types of discs in accordance with the present invention.

FIG. 6 shows an embodiment of an optical disc player in accordance with the present invention, wherein numeral 20 represents an optical disc shown in its sectional view, and numeral 26 represents a track whose height d corresponds to the height $d_1$ of the pregrooves in the case of a recordable disc and corresponds to the height $d_2$ of the signal pits in the case of a reproducing-only disc. Numeral 22 is a laser. The laser beam is reflected by a fixed mirror 24 through a beam splitter 23, and the laser beam is reduced by an objective lens 25, thereby irradiating the tracks of the optical disc 20. The laser beam reflected by the tracks 26 of the optical disc is separated by the beam splitter 23 by way of the fixed mirror 24, and the tracking signal is detected using the far-field method by a photodetector 29. Numeral 30 is a tracking signal detection circuit. The objective lens 25 is moved in the direction of the arrow 27 by a drive circuit 32 through an equalizer 31, and the laser beam emitted from the objective lens 25 is controlled so as to be kept on the track. The objective lens 25 is also controlled to move in the vertical direction of the optical disc 20 as indicated by arrow 28, so that the distance between the objective lens 25 and the track 26 may be kept constant.

Thus, even when the far-field tracking system is employed for detecting the tracks of the optical disc, the tracking servo action may function stably by setting the height of the tracks 21 at said value.

The details of the far-field tracking system shown in FIG. 6 are discussed in detail in U.S. Pat. No. 3,914,595 to Tinet and accordingly, a more detailed description thereof has been omitted for the sake of brevity.

Thus, in accordance with the present invention, recorded signals both from the recordable disc and the reproducing-only disc can be reproduced using the same optical system and a servo system, so that the usable range of the discs may be notably extended. For example, if discs on which necessary signals are recorded are required only in small quantities, these signals may be recorded one at a time on recordable discs, or if a large quantity of identical discs are required, reproducing-only discs may be manufactured by mass production techniques.

What is claimed is:

1. The combination of recordable-reproduceable optical discs and reproducing-only optical discs and an optical disc player having a common optical system for reproducing recorded signals both from a recordable-reproduceable optical disc having pregrooves and a reproducing-only optical disc having recording pits, wherein said common optical system has a common laser for irradiating both recordable-reproduceable discs and reproducing-only discs with a laser beam used for reading said discs, said laser having a wavelength $\lambda$, and wherein a depth or height of said pregrooves of said recordable-reproduceable optical disc is made equal to or less than $\lambda/8n$ and a depth or height of said recording pits of said reproducing-only optical disc is made equal to or greater than $\lambda/8n$ but less than $\lambda/4n$ and wherein n is a refractive index of a substrate of said discs or a refractive index of a protective layer provided on a surface of said discs.

2. The combination as recited in claim 1, wherein said depth or height of said pregrooves of said recordable-reproduceable optical disc and said depth or height of said recording pits of said reproducing-only optical disc are both made approximately equal to $\lambda/8n$.

* * * * *